Patented Oct. 14, 1941

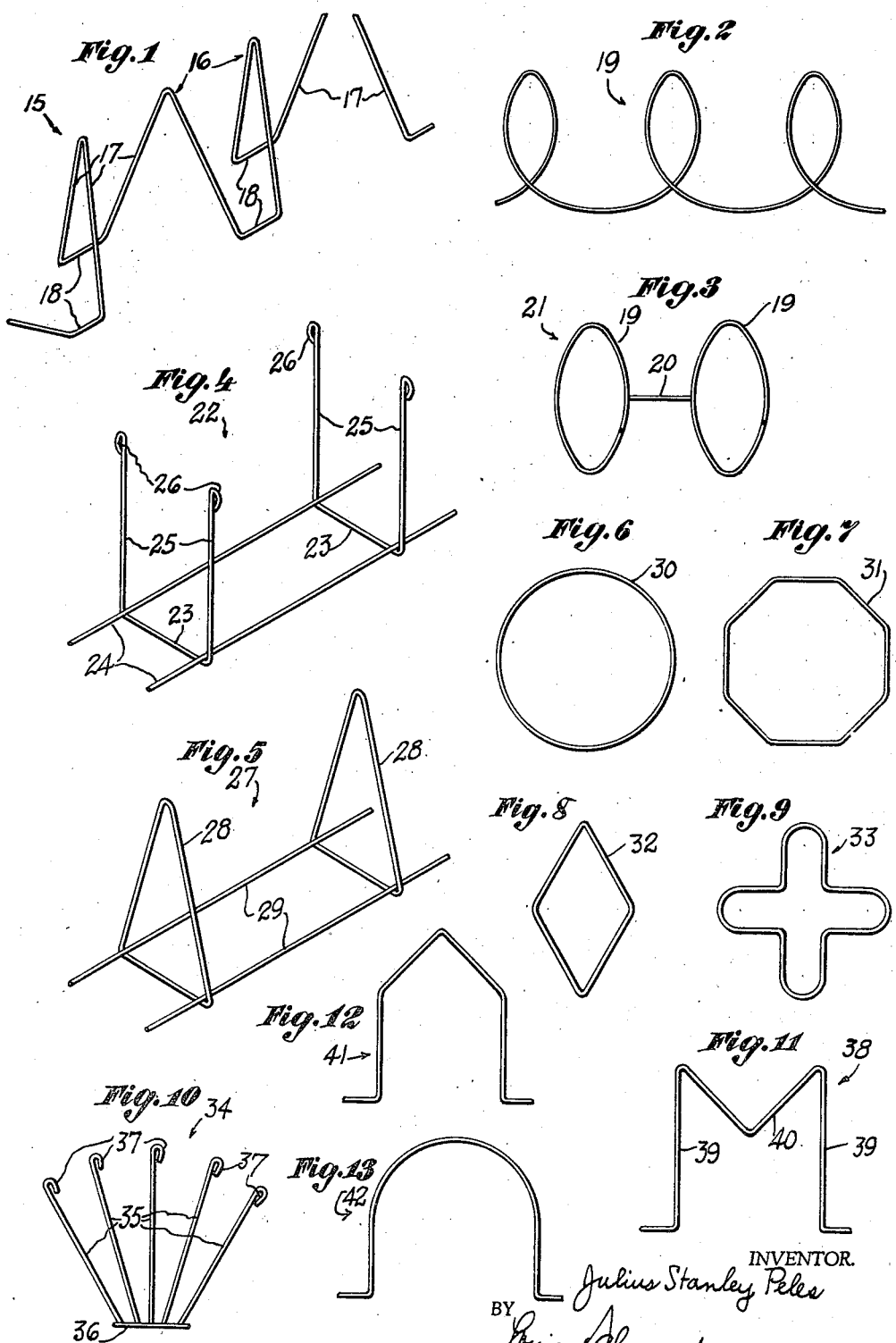

2,258,803

UNITED STATES PATENT OFFICE 2,258,803

BIRDPROOFING

Julius Stanley Peles, New York, N. Y.

Application May 24, 1939, Serial No. 275,469

2 Claims. (Cl. 20—1)

This invention relates to birdproofing.

One object of the invention is to provide improved birdproofing of the type that is applied to buildings for the purpose of preventing birds from alighting thereon.

Another object of the invention is the provision of improved birdproofing such as shall be very simple and inexpensive in construction, and which shall not collect leaves, papers and other debris, but which shall be self cleaning especially under the action of wind and weather.

Heretofore attempts have been made to furnish such birdproofing, but with certain unsatisfactory results, especially in that the points provided sometimes caused injury to a bird and thus tended in many cases to defeat the objects sought for.

Another object of the invention is to furnish certain improved embodiments thereof which involve a minimum of joints or welds, and which are adapted to be made of integral continuous structural lengths.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated in the annexed drawing, wherein like parts are designated by the same reference characters throughout the several views.

In the drawing:

Figure 1 is a perspective view of birdproofing embodying the invention.

Fig. 2 is a perspective view of one element of a modified birdproofing.

Fig. 3 is an end view showing a plurality of said elements joined together.

Fig. 4 is a perspective view of another modification.

Fig. 5 is a perspective view of another form of birdproofing.

Figs. 6 to 13 show different modified elements which may be arranged in the general manner of Figs. 4 and 5, transversely of the longitudinal connecting wires, or which in case of the elements of Figs. 11, 12 and 13, may be made up as continuous integral longitudinal structures, as suggested by the devices of Figs. 2 and 3.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawing, therefore, is submitted merely as showing the preferred exemplification of the invention.

Referring in detail to the drawing, 10 denotes birdproofing embodying the invention. The same may include a length of wire of any suitable metal or other material, having a series of projections 16 of any required spacing and height. The height and spacing referred to may vary with the size and nature of the birds that are to be prevented from alighting on the building or other structure to which the birdproofing may be applied. While these factors may be made to vary at different points so as to be operative against birds of different sizes and types, manufacturing requirements in general call for uniformity of size and shape. All of these considerations are intended to apply to the modifications hereinafter described.

Referring again to the device 15, it is seen that the wire provides upright portions 17, interconnected by the successive sections 18 which alternately lie in parallel lines to form a stable base. If desired, the portions 17 may lie in parallel planes at right angles to the sections 18, or they may lie in planes successively angular to each other as shown to thus conserve wire.

One or more lengths of the device 15 may be stretched along appropriate parts of a building, and may be merely secured at their ends or also at the intermediate points of the building, and, if desired, may be suitably interconnected at certain points. With this structure, it will be seen that birds are effectively prevented from alighting, and that the free open work arrangement is readily self cleaning, and further, that injury to birds is prevented as there are no sharp projecting points.

In Fig. 2 is shown birdproofing 19 comprising a helical wire, the turns of which may be circular or oval, with the longer axis upright, as shown. Certain other shapes, as in Figs. 7, 8, 9 and 12 may also be utilized in this general form of the invention.

In Fig. 3 is shown a plurality of the devices 19 interconnected as by elements 20 disposed at suitably spaced points along the length of the devices 19, to thus provide a stable structure. It will be appreciated that this resultant structure 21 may be mounted as shown or with the closed ends of the loops lowermost. Of course elements such as 15 may also be interconnected as shown at 20.

In Fig. 4 is shown birdproofing 22 which is in general like that disclosed in my Patent No. 2,142,371 issued January 3rd, 1939. In this device there are provided U-shaped elements 23 interconnected by the longitudinal wires 24, but with the upright arms 25 having looped or bent over end portions 26 to prevent injury to the birds that may attempt to alight, so that there may be no violation of any law or regulation directed to the protection of animals.

In Fig. 5 is shown a modified birdproofing 27 which comprises a plurality of triangular wire elements 28 whose sides are of equal length, and whose bases may be interconnected by the longitudinal parallel wires 29.

In Figs. 6 to 13 are shown different birdproofing elements adapted to be formed in a continuous structure. For example, Fig. 6 shows a circular wire element 30; Fig. 7 shows an octagonal wire element 31; Fig. 8 shows a trapezoidal wire element 32; and Fig. 9 shows a generally cross-shaped wire element 33. In Fig. 10 is shown a mushroom wire element 34, comprising wires 35 interconnected at their lower end by a wire 36, and having their upper ends bent or folded at 37 to prevent injury to the birds. Fig. 11 shows a generally M-shaped wire element 38 comprising vertical arms 39 and an intermediate downwardly bent section 40. Figs. 12 and 13 show wire elements 41, 42, of generally inverted U-shaped form, except that the element 41 is of somewhat sharper curvature than the element 42 to render it more difficult for birds to alight.

It will be noted that the elements of Figs. 6 to 13 may be interconnected by one or more wires as at 24 and 29 in Figs. 4 and 5, so that a birdproofing may be provided like that at 22 or 27 but comprising a series of elements 30, or a series of elements 31, and so on, as may be preferred.

It will be further observed that the elements of each of Figs. 11 to 13 may be formed in a continuous series, as suggested in Figs. 1 to 3, to provide birdproofing consisting of a single wire bent to form a series of the elements 38, or a series of the elements 41, and so on, as may be required; and that one or more such wire structures can be used and interconnected to extend in parallel longitudinal relation to each other as suggested in Fig. 3.

In all of the modifications, the spacing may be varied to suit, and any feasible material may be used. In all cases, injury to the birds is prevented, with the devices being relatively self cleaning, and being simple and inexpensive to make and install, so that the devices fulfill all the objects of the invention. In certain of the devices, as in that of Fig. 10, it may be desirable to drill holes in the concrete or building, as the case may be, and then to insert in each hole a plurality of the wires 35 in separate condition, then appling cement to secure the wires in place, and finally, bending the wires to spread the same to the fan or mushroom shape shown.

I claim:

1. A device including birdproofing for buildings comprising a wire structure having a series of like triangular elements, the elements being spaced from and parallel to each other to form a row, the upper ends of said elements being so bent as to be blunt to prevent injury to birds attempting to alight, said elements being of such height and spacing as to prevent predetermined birds from alighting, and a plurality of spaced wire members extending along said row and interconnecting the bottom portions of the elements to form a base therewith.

2. Birdproofing material comprising a plurality of longitudinal wires and a plurality of transverse interconnecting members each in the form of a wire triangle having a rounded apex, said longitudinal wires being affixed to said triangular members in the corners thereof remote from their rounded apexes with the bases of said triangles running between and holding the longitudinal wires apart and together forming a base for the material.

JULIUS STANLEY PELES.